United States Patent [19]

Hradel

[11] Patent Number: 4,462,742
[45] Date of Patent: Jul. 31, 1984

[54] DISKETTE PICKER

[75] Inventor: Anna M. Hradel, Mustang, Okla.

[73] Assignee: Magnetic Peripherals, Inc., Minneapolis, Minn.

[21] Appl. No.: 387,685

[22] Filed: Jun. 11, 1982

[51] Int. Cl.³ .............................................. G11B 17/22
[52] U.S. Cl. ...........:.............................. 414/280; 198/486; 198/650; 294/116; 360/98; 414/753
[58] Field of Search ............. 414/280, 331, 416, 751, 414/753; 198/486, 650, 653, 695, 696; 360/98; 294/116

[56] References Cited

U.S. PATENT DOCUMENTS 3,075,651  1/1963  Kaden .............................. 414/753 X
4,226,570 10/1980  Holecek ............................. 414/751

Primary Examiner—Robert G. Sheridan
Attorney, Agent, or Firm—Edwin H. Crabtree

[57] ABSTRACT

A diskette picker for gripping a magnetic data storage disk and retracting it from a disk storage housing and releasing the disk for loading onto a disk drive. The picker also returning the disk to the disk storage housing after the disk has been used. The picker automatically grips an edge of the disk when removing the disk from the storage housing and automatically releases the disk while loading the disk on a disk drive.

6 Claims, 6 Drawing Figures

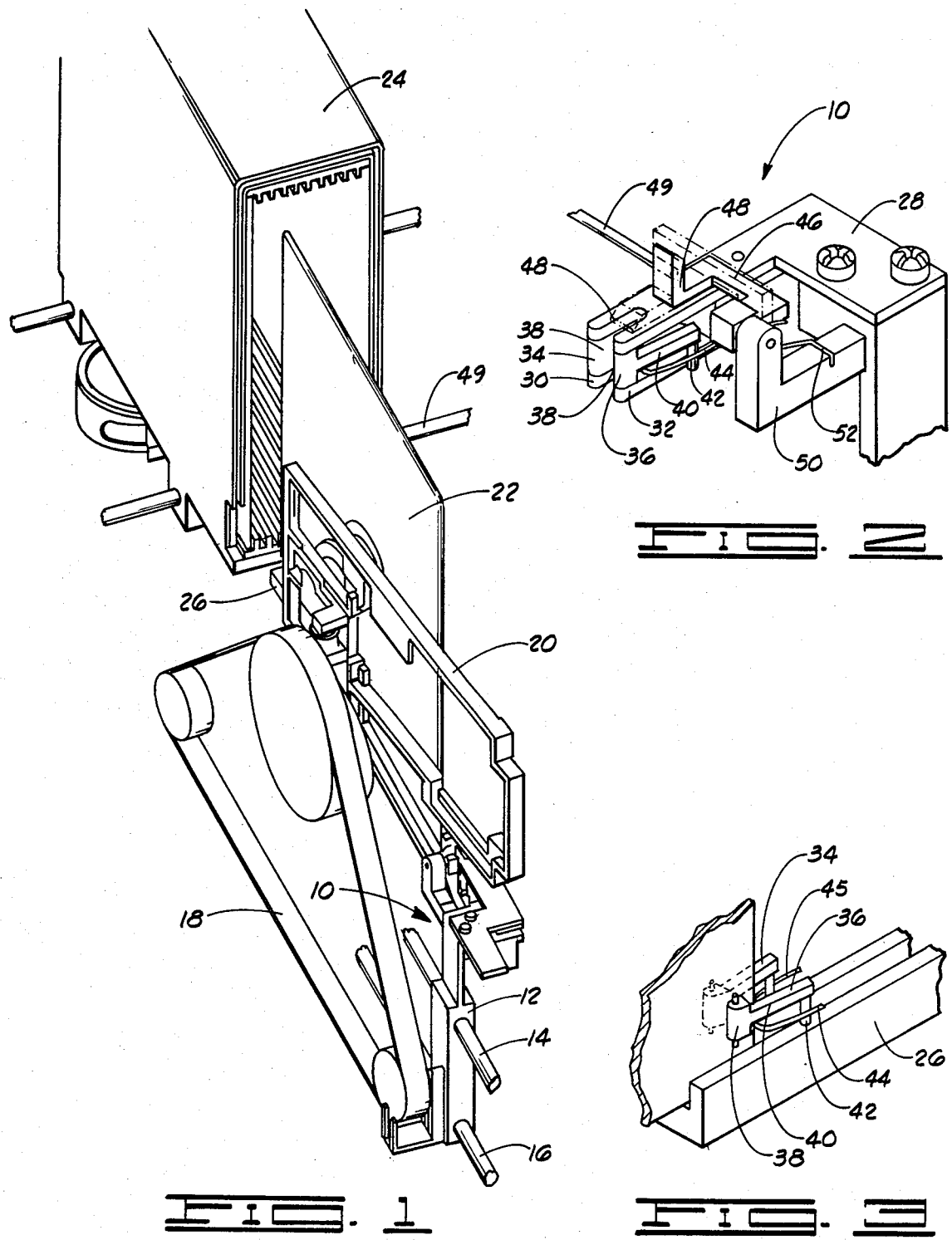

DISKETTE PICKER

BACKGROUND OF THE INVENTION

The subject invention relates to a device for removing a disk from a disk housing and automatically releasing the disk while loading onto a disk drive and returning the disk to a disk storage housing after the disk has been used and more particularly but not by way of limitation to a diskette picker used for gripping an edge of a magnetic data storage disk and retracting it from a disk storage housing and releasing the disk for loading onto a disk drive.

Heretofore there have been various types of devices for gripping and removing rotating disks such as phonographs, records, data storage disks and the like. More particularly, these devices are described in U.S. Pat. No. 3,960,264 to Carbine, U.S. Pat. No. 4,226,570 to Holecek et al and U.S. Pat. Nos. 4,173,427, 4,170,031 and 4,170,030 all to Beuch et al. None of these devices provide the combination of structure for providing the unique results and advantages of the diskette picker as described herein.

SUMMARY OF THE INVENTION

The subject invention automatically grips a magnetic data storage disk and retracts it from a disk storage housing and releases the disk while loading onto a disk drive. Further, the picker, when the disk has been used, returns the disk to its proper position in the disk storage housing.

The diskette picker can be used for removing one or a plurality of data storage disks stored in a disk storage housing. Further, the picker can be used for various sizes of data storage disks and with either rigid or flexible disks.

While the picker is described for use with a magnetic data storage disk, it can be appreciated that it can be used equally well for different types of recording mediums using a flat rotating member.

The diskette picker for gripping a magnetic data storage disk and retracting it from a disk storage housing and releasing the disk while loading onto a disk drive includes a picker assembly having a pair of outwardly extending picker assembly arms. A first and second flipper are pivotally mounted on the assembly arms and disposed in a spaced relationship to each other. The flippers are spring biased toward each other for receiving an edge of the disk therebetween and securing the disk when the disk is removed from the disk storage housing. The flippers engage a pair of cam surfaces which overcome the bias force of the spring urging the flippers away from each other and releasing the disk when the disk is in a loaded position on a disk drive.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a perspective view of the diskette picker mounted on a carriage assembly used for holding the disk thereon and loading the disk onto a disk drive.

FIG. 2 is a perspective view of the diskette picker.

FIG. 3 is a perspective view of the flippers engaging the edge of the disk.

DETAILED DESCRIPTION OF THE DRAWINGS

Figure 4:
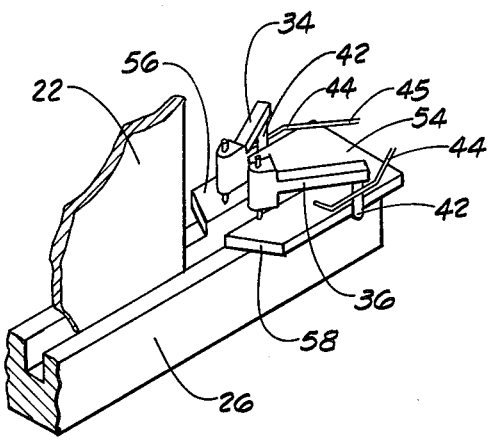
FIG. 4 is a perspective view of the flippers when the disk has been released.

In FIG. 1 the diskette picker which is part of a disk drive is shown in a perspective view and designated by general reference numeral 10. The picker 10 is mounted on a carriage assembly 12 which is slidably mounted on a pair of base mounted slide rods 14 and 16. The carriage assembly is driven by a drive belt 18. The disk drive includes a clam shell 20 for receiving a magnetic data storage disk 22 into the disk drive. Only a portion of the disk drive is shown in the drawings. The disk 22 is stored along with a plurality of disks in a disk storage housing 24.

Broadly, the diskette picker 10 is used, as the carriage assembly 12 is moved toward the disk storage housing 24, for engaging an edge of the disk 22 and retracting it from the disk storage housing 24. The belt 18 then moves the assembly 12 rearwardly away from the disk storage housing 24 with the picker 10 engaging the disk 22 and removing it from the housing 24. As the disk 22 is removed from the storage housing 24, the picker 10 securely grips the disk 22 with the bottom of the disk 22 received in a track 26 which is part of the disk drive. The clam shell 20 is rotated, loading the disk 22 onto the disk drive. When the disk 22 is seated in the disk drive, the picker 10 automatically releases the edge of the disk 22. When the disk 22 has been used, the picker 10 moves forward and meets the edge of the disk 22 and pushes it forwardly on the track 26 toward the disk storage housing 24 returning it to its proper position inside the housing 24.

In FIG. 2 the picker 10 can be more clearly seen mounted on a portion of the carriage 12. The picker 10 includes a picker assembly 28 having a first picker assembly arm 30 and a second picker assembly arm 32 parallel to each other and having a first flipper 34 pivotally mounted on the end of the first picker assembly arm 30 and a second flipper 36 pivotally mounted on the end of the second picker assembly arm 32. Each of the flippers 34 and 36 include a flipper nose 38, an outwardly extending flipper arm 40 integrally attached to the nose 38, and a downwardly extending flipper arm 42 attached to the end of the flipper arm 40. The flipper arms 40 are engaged by a pair of spring arms 44 of a spring 45. The bias force of the spring arms 44 rotate the noses 38 of the flippers 34 and 36 toward each other as shown more clearly in FIG. 3A.

Also seen in FIG. 2 is a spring biased rocker 46 having a rocker stop 48. The rocker 46 is pivotally mounted on the end of a rocker arm 50. The rocker 46 is biased by a rocker spring 52 in an up position which is shown in dotted lines. In this up position, the rocker stop 48 is positioned above and on top of the top assembly arms 30 and 32 blocking the entrance of the disk between the flipper noses 38 to prevent the edge of the disk 22 from becoming engaged by the noses 38 of the two flippers 34 and 36. In this position the rocker stop 48 is used to meet the edge of the disk 22 for pushing the disk 22 back to its original position inside the housing 24 after the disk 22 has been used. The carriage assembly 12 backs up a short distance leaving the disk 22 in the housing 24.

When it is desired to retract a new disk 22 from the housing 24, the rocker 46 is tipped back to a down position as shown in solid lines by a block. The block is not shown in the drawings. At this time the stop 48 rotates away from the upper assembly arms 30 and 32 thereby allowing the flippers 34 and 36 to securely grip the edge of the disk 22 as shown in FIG. 3 and remove it from the housing 24.

During travel to load the disk 22 the stop 48 rests at an angle against the edge of the disk 22. After the disk 22 is fully loaded on the disk drive the picker assembly backs away and the rocker 46 is then engaged by a pin 49 and moved into its up position with the stop 48 blocking the entrance between the flipper noses 38.

Figure 3A:
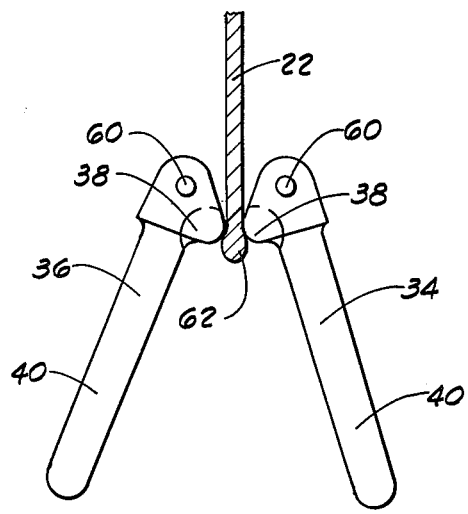
FIG. 3A is a top view of the flippers engaging the edge of the disk.
Figure 4A:
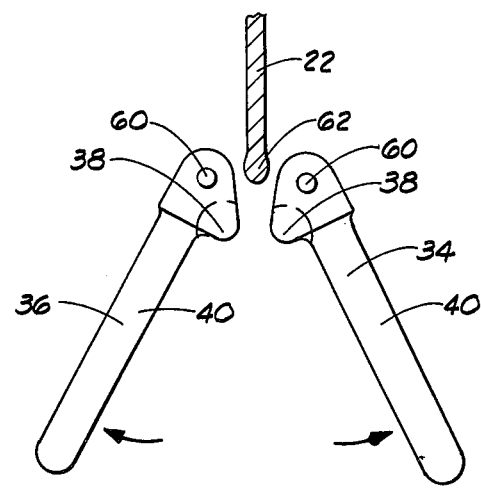
FIG. 4A is a top view of the flippers having released the edge of the disk.

As shown in FIG. 4 the disk 22 is released from the flippers 34 and 36 as the disk 22 is loaded on the disk drive, by the use of a stationary cam plate 54 having a first cam surface 56 and a second cam surface 58. As the disk 22 and picker 10 are retracted along track 26 the flipper arms 42 engage the cam surfaces 56 and 58 urging the arms 42 outwardly from each other and pivoting the noses 38 on pivot pins 60 which are engaging a curled ribbed edge 62 of the disk 22 as shown in FIG. 3A, away from each other. When the arms 42 reach a position as shown in FIG. 4 on the cam plate 54 the noses 38 of the flippers 34 and 36 have pivoted away from each other sufficiently to release the curled or ribbed edge 62 of the disk 22 as shown in FIG. 4A.

When the picker again moves forward along the track 26 to return the disk 22 to its storage 24 the cam plate 54 releases the arms 42 and the flippers are again in a position for engaging the disk 22. But as mentioned under the discussion of FIG. 2, the rocker stop 48 blocks the entrance between the noses 38 of the flippers 34 and 36 until a new disk 22 is to be retracted from the housing 24.

Changes may be made in the construction and arrangement of the parts or elements of the embodiments as described herein without departing from the spirit or scope of the invention defined in the following claims.

What is claimed is:

1. A diskette picker for gripping a magnetic storage disk and retracting it from a disk storage housing and releasing the disk for loading onto a disk drive, the picker after the disk has been used, returning the disk to the disk storage housing, the picker comprising:
   a pair of flippers pivotally mounted on a picker assembly the flippers including a flipper nose for engaging each side of the edge of the disk, a flipper arm integrally attached and extending outwardly from the flipper nose and a flipper arm pin attached to the end of the flipper arm;
   a spring having a pair of spring arms, the spring arms engaging the flipper arm pins for biasing the flipper noses inwardly toward each other; and
   release means for engaging the flippers and pivoting the flipper noses away from each other and releasing the disk when loading the disk on a disk drive.

2. The picker as described in claim 1 further including a spring biased rocker pivotally mounted on top of the picker assembly, the rocker having a stop disposed adjacent the flippers, the stop biased in a down position blocking the entrance of the disk between the pair of flippers to prevent the flippers from engaging the disk when the disk is being returned to the disk storage housing.

3. The picker as described in claim 1 wherein the release means is a stationary cam plate having a first cam surface and a second cam surface, the first and second cam surfaces engaging the flippers for overcoming the bias force of the spring arms and urging the flippers away from each other for releasing the disk prior to loading the disk on the disk drive.

4. The picker as described in claim 1 wherein the picker assembly includes a first picker assembly arm and a second picker assembly arm extending outwardly therefrom, one of the flippers pivotally mounted on the first assembly arm, the other flipper pivotally mounted on the second assembly arm, the first and second picker assembly arms parallel to each other with the edge of the disk received therebetween when the flipper noses engage the edge of the disk.

5. A diskette picker for gripping a magnetic data storage disk and retracting it from a disk storage housing and releasing the disk during loading onto a disk drive, the picker after the disk has been used returning the disk to the disk storage housing, the picker comprising:
   a picker assembly having a first picker assembly arm and a second picker assembly arm parallel to each other and extending outwardly from the picker assembly;
   a first flipper pivotally mounted on the first picker assembly arm and a second flipper pivotally mounted on the second picker assembly arm, the flippers having a flipper nose, a flipper arm integrally attached to the flipper nose and a flipper arm pin attached to the end of the flipper arm;
   a spring having a pair of spring arms, the spring attached to the picker assembly, the arms of the spring engaging the flipper arm pins for pivoting the flipper noses toward each other, the noses of the flippers disposed in a spaced relationship to each other and adapted for receiving an edge of the disk therebetween; and
   a stationary cam plate having a first cam surface and a second cam surface, the surfaces disposed in a spaced relationship to each other and adapted for receiving the edge of the disk therebetween the first cam surface and the second cam surface engaging the flipper arm pins for overcoming the bias force of the spring arms and rotating the flipper noses away from each other and releasing the disk during loading of the disk on the disk drive.

6. The picker as described in claim 5 further including a spring biased rocker pivotally mounted on top of the picker assembly, the rocker having a stop disposed adjacent the flippers, the stop biased in a down position blocking the entrance between the pair of flippers to prevent the flippers from engaging the disk when the disk is returned to the disk storage housing.

* * * * *